(12) United States Patent
Paris et al.

(10) Patent No.: US 9,390,484 B2
(45) Date of Patent: Jul. 12, 2016

(54) METHODS AND APPARATUS FOR TONE MAPPING HIGH DYNAMIC RANGE IMAGES

(71) Applicant: Adobe Systems Incorporated, San Jose, CA (US)

(72) Inventors: Sylvain P. Paris, Jamaica Plain, MA (US); Jen-Chan Chien, Saratoga, CA (US); Eric Chan, Belmont, MA (US)

(73) Assignee: Adobe Systems Incorporated, San Jose, CA (US)

( * ) Notice: Subject to any disclaimer, the term of this patent is extended or adjusted under 35 U.S.C. 154(b) by 55 days.

(21) Appl. No.: 14/451,180

(22) Filed: Aug. 4, 2014

(65) Prior Publication Data

US 2014/0341468 A1    Nov. 20, 2014

Related U.S. Application Data

(63) Continuation of application No. 12/695,100, filed on Jan. 27, 2010, now Pat. No. 8,831,340.

(51) Int. Cl.

| | | |
|---|---|---|
| *G06T 5/00* | (2006.01) | |
| *H04N 1/60* | (2006.01) | |
| *H04N 19/30* | (2014.01) | |
| *G06F 3/0484* | (2013.01) | |
| *G06T 5/40* | (2006.01) | |
| *G06T 5/50* | (2006.01) | |

(Continued)

(52) U.S. Cl.
CPC ............ *G06T 5/008* (2013.01); *G06F 3/04845* (2013.01); *G06T 5/007* (2013.01); *G06T 5/40* (2013.01); *G06T 5/50* (2013.01); *G06T 7/408* (2013.01); *G06T 11/001* (2013.01); *H04N 1/6027* (2013.01); *H04N 19/30* (2014.11); *G06T 2207/10024* (2013.01); *G06T 2207/20092* (2013.01); *G06T 2207/20192* (2013.01); *G06T 2207/20208* (2013.01); *G06T 2207/20221* (2013.01)

(58) Field of Classification Search
None
See application file for complete search history.

(56) References Cited

U.S. PATENT DOCUMENTS

| | | | |
|---|---|---|---|
| 7,146,059 B1 * | 12/2006 | Durand | .................. G06T 5/007 345/617 |
| 8,467,601 B2 | 6/2013 | Daisy | |
| 8,824,829 B2 | 9/2014 | Rempel et al. | |

(Continued)

OTHER PUBLICATIONS

"Corrected Notice of Allowance", U.S. Appl. No. 12/695,100, Jun. 24, 2014, 4 pages.

(Continued)

*Primary Examiner* — Wesley Tucker
(74) *Attorney, Agent, or Firm* — Wolfe-SBMC

(57) ABSTRACT

Methods, apparatus, and computer-readable storage media for tone mapping High Dynamic Range (HDR) images. An input HDR image is separated into luminance and color. Luminance is processed to obtain a base layer and a detail layer. The base layer is compressed according to a non-linear remapping function to reduce the dynamic range, and the detail layer is adjusted. The layers are combined to generate output luminance, and the output luminance and color are combined to generate an output image. A base layer compression technique may be used that analyzes the details and compresses the base layer accordingly to provide space at the top of the intensity scale where the details are displayed to thus generate output images that are visually better than images generated using conventional techniques. User interface elements may be provided via which a user may control one or more parameters of the tone mapping method.

20 Claims, 8 Drawing Sheets

(51) Int. Cl.
*G06T 7/40* (2006.01)
*G06T 11/00* (2006.01)

(56) References Cited

U.S. PATENT DOCUMENTS

| | | | |
|---|---|---|---|
| 8,831,340 B2 | 9/2014 | Paris et al. | |
| 9,230,312 B2 | 1/2016 | Paris et al. | |
| 2009/0046207 A1 | 2/2009 | Salvucci | |
| 2009/0161953 A1* | 6/2009 | Ciurea | H04N 1/4074 382/172 |
| 2012/0236020 A1 | 9/2012 | Paris et al. | |
| 2013/0121572 A1 | 5/2013 | Paris | |

OTHER PUBLICATIONS

"Non-Final Office Action", U.S. Appl. No. 12/695,100, May 14, 2013, 7 pages.

"Notice of Allowance", U.S. Appl. No. 12/695,100, Apr. 29, 2014, 6 pages.

Bae, et al., "Two-Scale Tone Management for Photographic Look", ACM Transactions on Graphics, 25(3), Proceedings of the ACM SIGGRAPH Conference, 2006, 9 pages.

Debevec, et al., "High Dynamic Range Imaging", SIGGRAPH 2004 Course 13, Aug. 9, 2004, pp. 1-34.

Devlin, et al., "Tone Reproduction and Physically Based Spectral Rendering", Eurographics 2002, 2002, 23 pages.

Durand, "Fast Bilateral filtering for the Display of High-Dynamic-Range Images", ACM Transactions on Graphics (TOG), Proceedings of the 29th Annual Conference on Computer Graphics and Interactive Techniques SIGGRAPH-02, vol. 21, Issue 3, 2002, 10 pages.

Fattal, et al, "Gradient Domain High Dynamic Range Compression", ACM SIGGRAPH, 2002, 8 pages.

Ledda, et al., "Evaluation of Tone Mapping Operators Using a High Dynamic Range Display", ACM Transactions on Graphics (TOG), vol. 24, Issue 3, Proceedings of ACM SIGGRAPH 2005, 2005, 9 pages.

Mantiuk, et al., "A Perceptual Framework for Contrast Processing of High Dynamic Range Images", ACM Transactions on Applied Perception 3(3), 2006, 14 pages.

Qiu, et al., "Tone Mapping for HDR Image Using Optimization—A New Closed Form Solution", Proceedings from ICPR, 18th International Conference on Pattern Recognition, vol. 1, 2006, 4 pages.

Reinhard, et al., "Image Display Algorithms for High- and Low-dynamic Range Display Devices", Society for Information Display, May 2007, pp. 997-1014.

"Non-Final Office Action", U.S. Appl. No. 13/485,576, Jun. 22, 2015, 7 pages.

"Notice of Allowance", U.S. Appl. No. 13/485,576, Sep. 28, 2015, 6 pages.

* cited by examiner

METHODS AND APPARATUS FOR TONE MAPPING HIGH DYNAMIC RANGE IMAGES

RELATED APPLICATIONS

This application claims priority under 35 U.S.C. Section 120 as a continuation of U.S. patent application Ser. No. 12/695,100, filed Jan. 27, 2010, and titled "Methods and Apparatus for Tone Mapping High Dynamic Range Images", the entire disclosure of which is hereby incorporated by reference in its entirety.

BACKGROUND

High Dynamic Range (HDR) Imaging

The amount of variation of light in the world is huge. Normal objects in sunlight and in a shadow often differ in brightness by a factor of 10,000 or more. Objects deep in a room, seen through a small window from outside, can be very dark compared to the outside wall of the house illuminated by direct sunlight. Such environments are difficult to capture, for example, in 8-bit images, which provide a pixel brightness range of only 0 to 255, or even in 10- or 12-bit images as captured by most conventional digital cameras. Conventional film cameras have a slightly higher, but nonlinear, range. However, conventional film scanning techniques are generally limited to less than 16-bit (for example, 10-bit or 12-bit); thus, digitizing conventional film limits the dynamic range.

High dynamic range imaging (HDRI, or just HDR) allows a greater dynamic range of luminance between light and dark areas of a scene than conventional imaging techniques. An HDR image more accurately represents the wide range of intensity levels found in real scenes. Pixel values of digital HDR images thus require more bits per channel than conventional images. An HDR imaging technique may, for example, use 16-bit or 32-bit floating point numbers for each channel to capture a much wider dynamic range of luminance than is captured using standard imaging techniques.

HDR images may, for example, be generated by capturing multiple images at different exposures (e.g., using different F-stops and/or shutter speeds) with a conventional camera, and then combining the image data from the multiple images into a single HDR image. HDR images are not directly displayable to a display device or printable; the information stored in HDR images corresponds to the physical values of luminance. In contrast, the information stored in standard digital images represents colors that should appear on a display device or a paper print, and has a more limited dynamic range. Thus, to view a scene captured in a HDR image, the HDR image may be converted via some technique that approximates the appearance of high dynamic range in a standard digital image, for example an RGB image.

Tone Mapping

Tone mapping is a technique that may be used in image processing and computer graphics to map a set of colors to another set of colors. For example, tone mapping may be used to approximate the appearance of high dynamic range (HDR) images in media with a more limited dynamic range. Conventional methods of tone mapping HDR images may include decomposing an image into a base layer, detail layer, and color layer. In general, the base layer encodes large-scale variations in contrast, while the detail layer encodes fine changes in contrast (i.e., detail). The base layer is then compressed to the lower dynamic range of the output medium by multiplying all values of the base layer by a scaling factor. The detail layer then added back into the base layer. However, in compressing the base layer, these conventional methods use a single, linear scaling factor that distributes the values across the entire range of the output medium. For example, if the range of the output medium is 0 . . . 255, a scaling factor will be used that distributes the compressed values from the base layer from 0 to 255. However, this conventional technique tends to clip details of the scene.

SUMMARY

Various embodiments of methods, apparatus, and computer-readable storage media for tone mapping High Dynamic Range (HDR) images are described. In embodiments, an input HDR image is separated into a luminance component and a color component. Only the luminance component is modified. The luminance component may be processed using a bilateral filter to obtain a base layer and a detail layer. In general, the base layer encodes large-scale variations in contrast, while the detail layer encodes fine changes in contrast (i.e., detail). Both layers may be transformed: the base layer is compressed according to a non-linear remapping function to reduce the dynamic range, while the detail layer may, for example, be amplified to reveal the image details. Embodiments employ a base layer compression technique that analyzes the details and compresses the base layer based on the analysis to provide space at the top of the intensity scale where the details and variations are displayed to thus generate output images that are visually better, particularly in regards to details, than images generated using conventional tone mapping techniques.

In embodiments, the detail layer D is analyzed to estimate how much space is needed for D in the lower dynamic range to which the HDR image I is being tone mapped. The highlights of the base layer B are then compressed using a non-linear remapping function that leaves space at the top of the range according to the estimation. To control the shadows, a remapping function may be applied to the base layer B shadows. The detail layer D is appropriately adjusted, and the compressed base layer and adjusted detail layer are combined into an output luminance. Color C and the output luminance are then appropriately recombined to generate an output image.

Some embodiments may provide a user interface that includes user interface elements via which a user may control one or more parameters of the tone mapping method. The user interface may provide user interface elements to control one or more of, but not limited to: glow extent and strength that control the size and strength of the glows that may be visible around contrasted edges; contrast, which controls the dynamic range of the output; highlight, which brightens or darkens the bright regions of the images; shadow, which brightens or darkens the dark regions of the images; exposure, which globally scales up or down the image intensities; detail, which controls the amplitude of the texture; and saturation, which controls the saturation of the colors.

In some embodiments, default values may be used for the various parameters that attempt to produce images that look as much as possible like normal photographs. However, via the user interface, users may modify one or more of the parameters to obtain an "HDR look" (glowing edges, low contrast, and saturated colors) in images, for example by increasing the glow extent and amplitude, reducing the contrast, and increasing saturation and texture, or may modify one or more parameters to achieve various other desired visual effects.

Figure 1A:
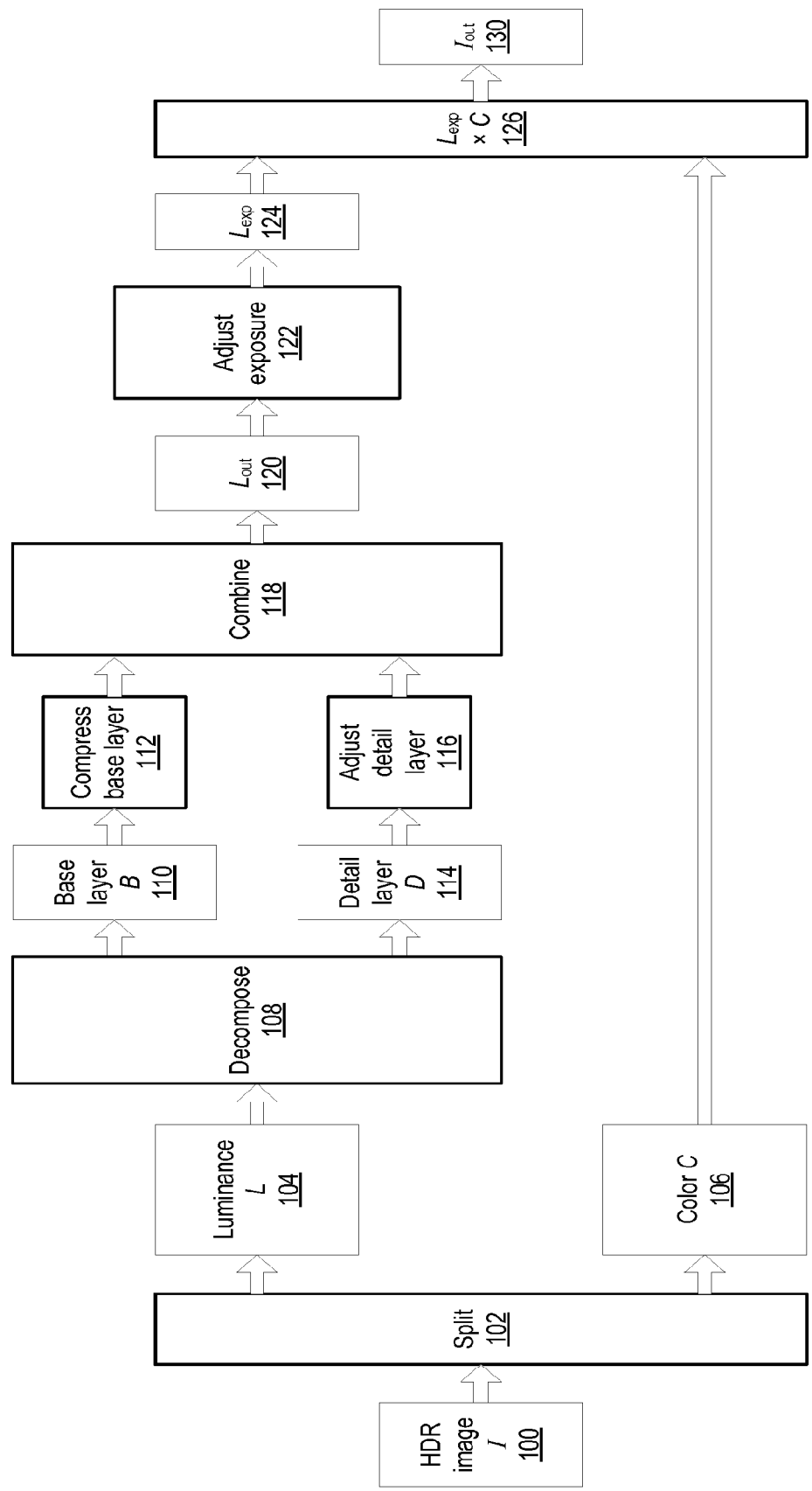
FIG. 1A is a block diagrams that illustrates data flow and processing in a method for tone mapping High Dynamic Range (HDR) images according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods, apparatus, and computer-readable storage media for tone mapping High Dynamic Range (HDR) images are described. In embodiments, an input HDR image I is separated into a luminance component L and a color component C. Only the luminance component L is modified. The luminance component may be processed using a bilateral filter to obtain a base layer B and a detail layer D. In general, the base layer encodes large-scale variations in contrast, while the detail layer encodes fine changes in contrast (i.e., detail). Both layers may be transformed: B is compressed to reduce the dynamic range, while D may be amplified to reveal the image details. Compression, in this usage, refers to remapping the values of the pixels of the HDR image to the lower dynamic range of the pixels of an output image, for example an 8-bit, 3-channel RGB image, for which the dynamic range is 0 . . . 255.

In embodiments, the detail layer D is analyzed to estimate how much space is needed for D in the lower dynamic range to which the HDR image I is being remapped. The highlights of the base layer B are then compressed using a non-linear remapping function that leaves space at the top of the range according to the estimation. For example, in a dynamic range of 0 . . . 255, the top of the range to which the base layer is compressed may be 240, 250, or some other value based upon the estimation. A remapping function is applied to the base layer B shadows. The detail layer D is appropriately adjusted, and the compressed base layer and adjusted detail layer are combined into an output luminance. Color C and the output luminance are then appropriately recombined to generate an output, lower dynamic range image.

Thus, embodiments employ a base layer compression technique that analyzes the details and compresses the base layer based on the analysis to provide space at the top of the intensity scale where the details and variations are displayed to thus generate output images that are visually better, particularly in regards to details, than images generated using conventional tone mapping techniques applied to HDR images which employ a linear scaling factor that tends to flatten the details.

Figure 5:
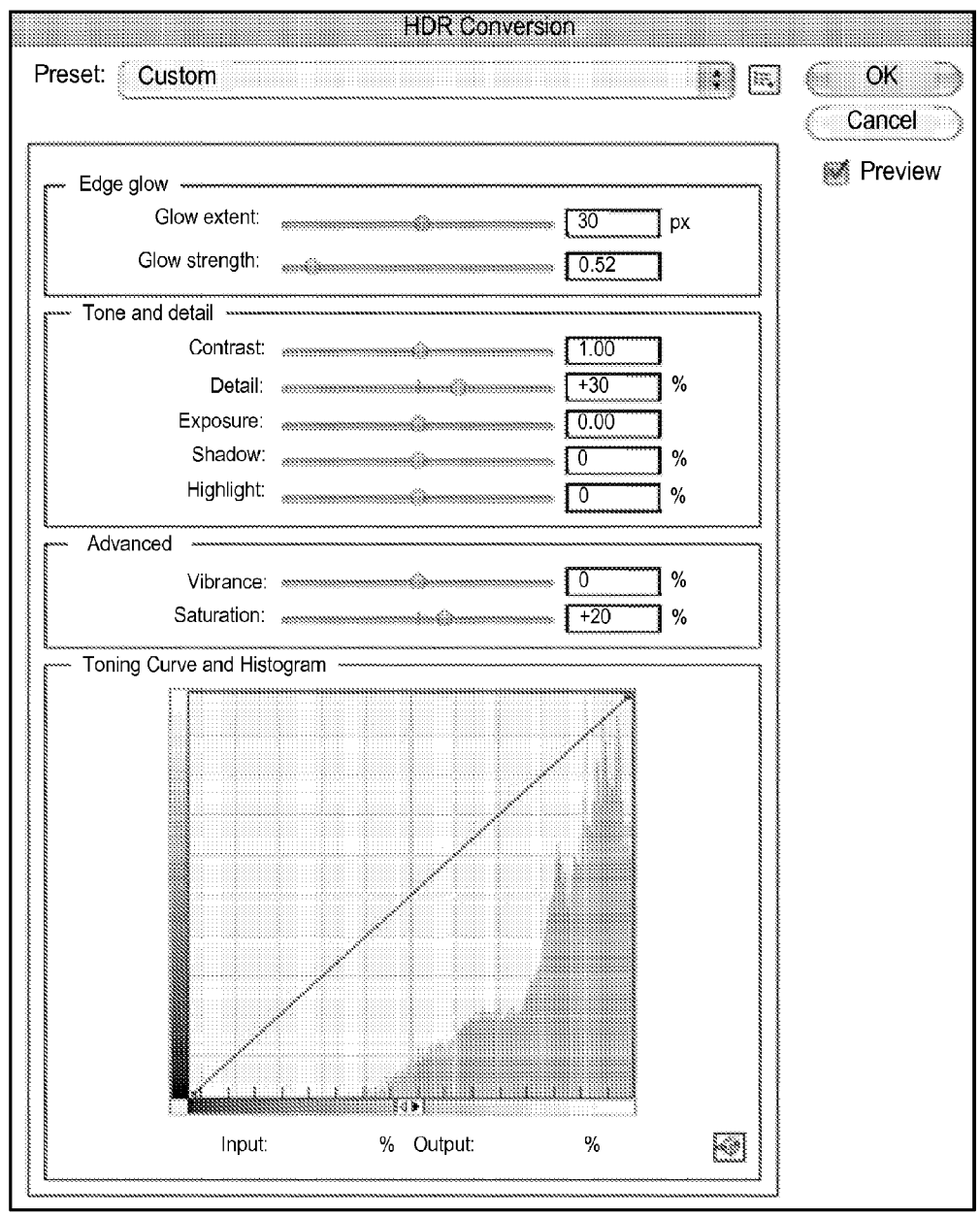
FIG. 5 shows an example user interface to a tone mapping module that implements a method for tone mapping HDR images as described in FIGS. 1A through 3.

Some embodiments may provide a user interface that includes user interface elements via which a user may control one or more parameters of the tone mapping method, for example implemented in a tone mapping module. An example user interface is shown in FIG. 5. The user interface may provide user interface elements to control one or more of the following parameters, and/or other parameters not listed here.

Glow extent and amplitude (or strength): These two parameters affect the bilateral filter and control the size and strength of the glows (a.k.a. halos) that may be visible around contrasted edges.

Contrast: controls the dynamic range of the output, that is, the difference of the brightest and darkest points.

Highlight: brightens or darkens the bright regions of the images.

Shadow: brightens or darkens the dark regions of the images.

Exposure: globally scales up or down the image intensities.

Detail: controls the amplitude of the texture.

Saturation: controls the saturation of the colors.

In some embodiments, default values may be used for the various parameters that attempt to produce images that look as much as possible like normal photographs. However, via the user interface, users may modify one or more of the parameters to obtain an "HDR look" (glowing edges, low contrast, and saturated colors) in images, for example by increasing the glow extent and amplitude, reducing the contrast, and increasing saturation and texture, or may modify one or more parameters to achieve various other desired visual effects.

Figure 6:
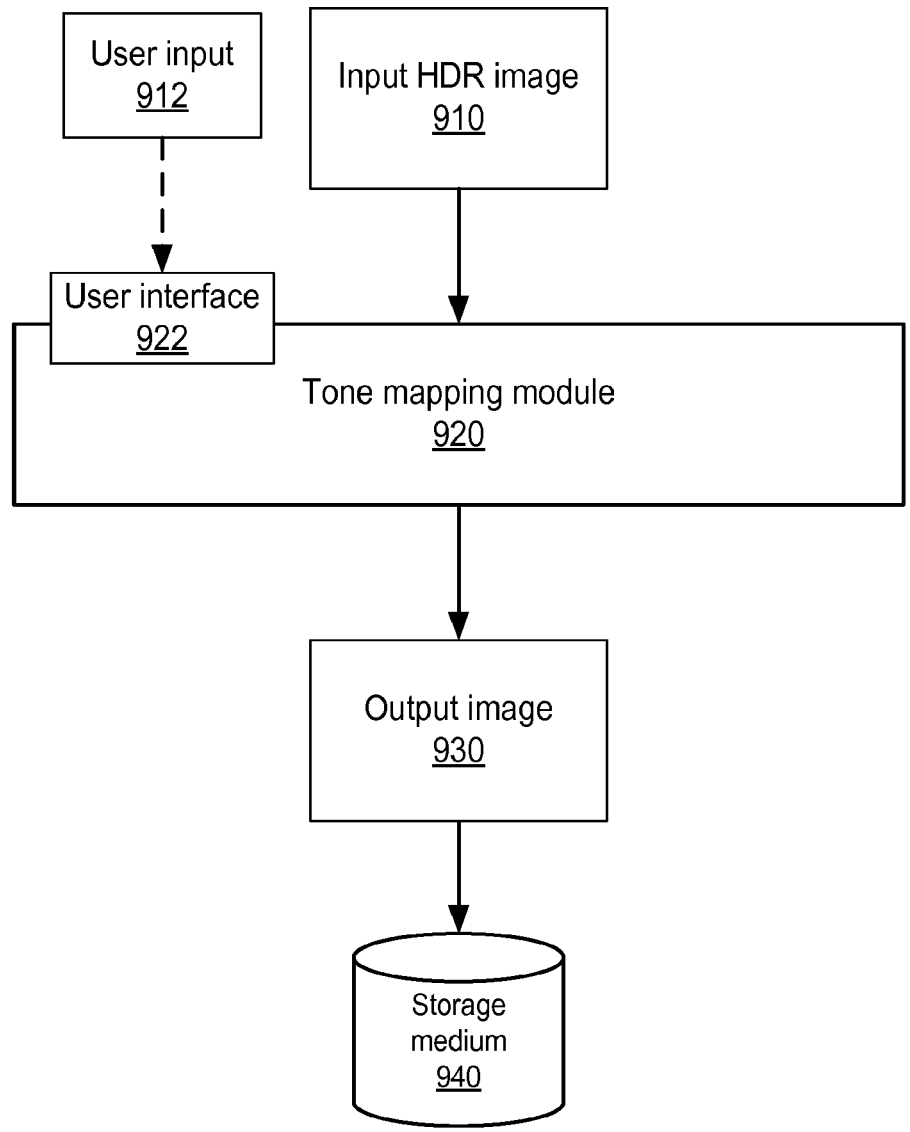
FIG. 6 illustrates a tone mapping module that may implement an embodiment of the method for tone mapping HDR images illustrated in FIGS. 1A through 3.
Figure 7:
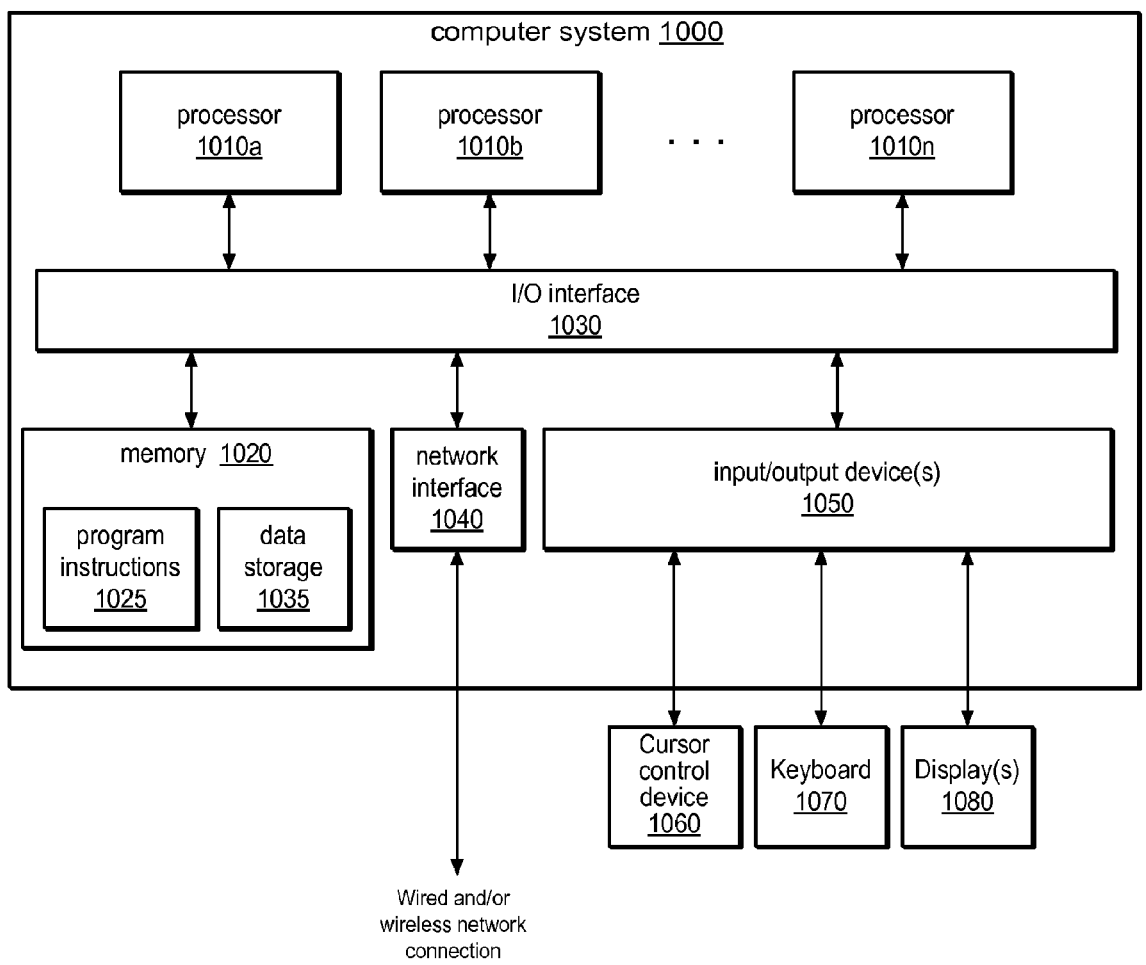
FIG. 7 illustrates an example computer system that may be used in embodiments.

Embodiments of the method for tone mapping High Dynamic Range (HDR) Images as described herein may be implemented as or in a tone mapping module. Embodiments of the tone mapping module may, for example, be implemented as a standalone image processing application, as a module of an image processing application, as a plug-in for applications including image processing applications, and/or as a library function or functions that may be called by other applications. Embodiments of the tone mapping module may be implemented in any image processing application, including but not limited to Adobe® PhotoShop® Adobe® PhotoShop® Elements®, and Adobe® After Effects®. An example tone mapping module is illustrated in FIG. 6. An example system on which an image blending module may be implemented is illustrated in FIG. 7.

While embodiments are described in reference to tone mapping HDR images to generate output images of a lower dynamic range, the method of separating luminance into a base layer and a detail layer, compressing the base layer using a non-linear remapping function to leave room at the high end of the range for the details, and recombining the compressed base layer and detail layer may be applied in various other image processing tasks in which luminance needs to be compressed. The tone mapping methods may be applied to both color and grayscale HDR images. In addition, the tone mapping methods may be applied to other types of images than HDR images, such as low dynamic range images. To apply the methods described herein to low-dynamic range images (e.g., 8- or 16-bit images), in some embodiments, one or more 8- or 16-bit images may be converted into a 32-bit image, and the tone mapping methods described herein may then be applied to the 32-bit image.

Figure 1B:
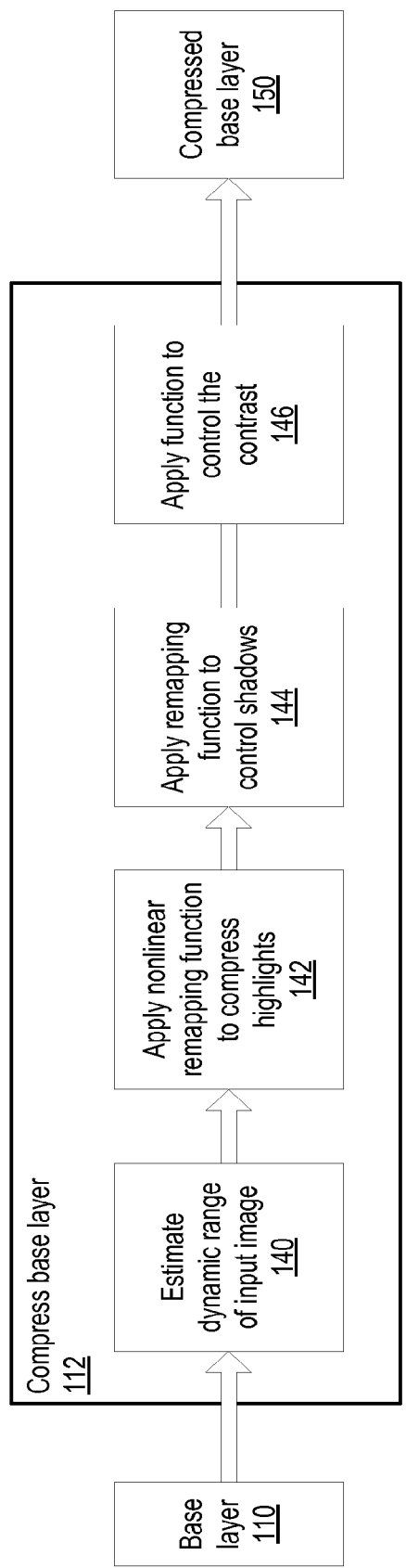
FIG. 1B is a block diagram that illustrates the compress base layer component of FIG. 1A in more detail, according to some embodiments.

FIGS. 1A and 1B—Block Diagrams of a Method for Tone Mapping HDR Images

FIGS. 1A and 1B are block diagrams that illustrate data flow and processing in a method for tone mapping High Dynamic Range (HDR) images according to some embodiments. FIG. 1A is a high-level view of the process. In FIG. 1A, an input HDR image I 100 is separated, at 102, into a luminance component L 104 and a color component C 106. Only the luminance component L 104 is modified. At 108, the luminance component may be decomposed, for example using a bilateral filter, to obtain a base layer B 110 and a detail layer D 114. In general, the base layer encodes large-scale variations in contrast, while the detail layer encodes fine changes in contrast (i.e., detail). Both layers may be transformed: base layer B 110 is compressed at 112 using a base layer compression technique described below that reduces the dynamic range, while detail layer D 114 may be adjusted at 116, for example D may be amplified to more clearly reveal the image details. Compressed base layer B 110 and adjusted detail layer D 114 may then be combined at 118 to generate $L_{out}$ 120. Exposure may be adjusted for $L_{out}$ at 122 to generate $L_{exp}$ 124. $L_{exp}$ 124 and color C 106 may then be combined at 126 to generate the output image $I_{out}$ 130.

FIG. 1B shows the compress base layer 112 component of FIG. 1A in more detail, according to some embodiments. The dynamic range of the input image is estimated at 140. This provides information (e.g., maximum and minimum values) so that the compression process knows the scale of the input and thus how much to compress. At 142, a nonlinear remapping function, for example as described later in this document, is applied to compress highlights of the base layer B 110. This remapping function leaves appropriate space at the top of the range for detail D 114, once appropriately adjusted. At 144, a remapping function is applied to control shadows of the base layer B 110. At 146, a function may be applied that controls the contrast of the base layer. A compressed base layer 150 is output.

The following describes various elements of data flow and processing as illustrated in FIGS. 1A and 1B in more detail.

Color-Luminance Separation

In FIG. 1A, an input HDR image I 100 is separated, at 102, into a luminance component L 104 and a color component C 106. To perform color-luminance separation, some embodiments may separate the input image I into its luminance L and its color $C=(C_r, C_g, C_b)$ as follows:

Luminance L may be defined as a linear combination of the RGB channels of $I=(I_r, I_g, I_b)$ $$L = \frac{20I_r + 40I_g + I_b}{61} \qquad (1)$$

Color C may be defined as the ratio I/L:

$$C = (C_r, C_g, C_b) = \frac{I}{L} = \left(\frac{I_r}{L}, \frac{I_g}{L}, \frac{I_b}{L}\right) \qquad (2)$$

Other embodiments may use other techniques or formulas, or variations of those given above, to separate color and luminance.

Base-Detail Separation

At 108 of FIG. 1A, luminance L is decomposed into a base layer B and a detail layer D. In general, the base layer encodes large-scale variations in contrast, while the detail layer encodes fine changes in contrast (i.e., detail). In some embodiments, to decompose L into a base layer B and a detail layer D, the base layer may be computed using a bilateral filter bf applied to the logarithm of the luminance L:

$$B = bf(\ln L) \qquad (3)$$

In some embodiments, the space parameter $\sigma_s$ of the bilateral filter depends on the image size:

$$\sigma_s = 0.03 \min(width, height) \qquad (4)$$

In some embodiments, the range parameter $\sigma_s$ may be set to a default value. In some embodiments, $\sigma_s$ is set by default to 0.25.

In some embodiments, the user may control $\sigma_s$ and $\sigma_r$ via user interface elements, for example sliders, which may for example be named "glow extent" and "glow amplitude" or similar.

In some embodiments, detail D may be the residual of the bilateral filter.

$$D = \ln l - B \tag{5}$$

Other embodiments may use other techniques or formulas, or variations of those given above, to decompose luminance into a base layer B and a detail layer D.

Compressing the Base Layer

At 112 of FIG. 1A, base layer B 110 is compressed using a base layer compression technique that reduces the dynamic range. FIG. 1B shows element 112 of FIG. 1A in more detail.

Estimating the Dynamic Range

As indicated at 140 of FIG. 1B, embodiments may estimate the dynamic range of the input image, that is, the maximum brightness $B_{max}$ and minimum brightness $B_{min}$. Some embodiments may use percentiles $p_n\%$, where $p_n\%$ is such that there is n % of the image values below or above, to clip some pixels. The following gives example values for n; these values are not intended to be limiting:

$$B_{min} = p_{0.25\%}(B) B_{max} = p_{99.75\%}(B) \Delta B = B_{max} - B_{min} \tag{6}$$

The example values for n % given above effectively clip 0.25% of pixels at the top and bottom of the dynamic range. This, for example, clips outlier pixels, such as single pixels that are extremely bright, from the range. Some embodiments may provide a user interface element that allows the user to adjust the percentiles used for $B_{max}$ and/or $B_{min}$.

Other embodiments may use other techniques or formulas, or variations of those given above, to estimate the dynamic range.

Compressing Highlights

As indicated at 142 of FIG. 1B, the highlights are compressed. Some embodiments may use a remapping function that is smooth and that decreases the intensity of the bright pixels of the base layer B while leaving the dark pixels unchanged. In some embodiments, the remapping function may be based on the following function:

$$f(x, h) = \begin{cases} h & \text{if } x = 0 \\ x & \text{if } h = 0 \\ \dfrac{x}{1 - \exp(-x/h)} & \text{if } h < 0 \\ 2x - \dfrac{x}{1 - \exp(x/h)} & \text{otherwise} \end{cases} \tag{7}$$

The first variable x is the remapped value; the h variable controls how much the bright pixels are darkened. For instance, h=0 leaves no space at the top of the intensity scale, that is, all the details in the highlights are clipped, while h=−0.5 lowers the intensity of the bright pixels of 0.5 log-luminance units so that highlight details up to 0.5 log-luminance units appear. Using this function, some embodiments may remap the base value of a given pixel x as follows:

$$B_h(x) = B_{min} + f(B(x) - B_{max}, h) - f(-\Delta B, h) \tag{8}$$

where h is a user-controlled parameter that controls the brightness of the highlight areas. In some embodiments, h may be expressed in log-luminance units. This nonlinear remapping function leaves space at the top of the dynamic range for the details, which are recombined with the compressed layer in a later step described below.

Figure 2:
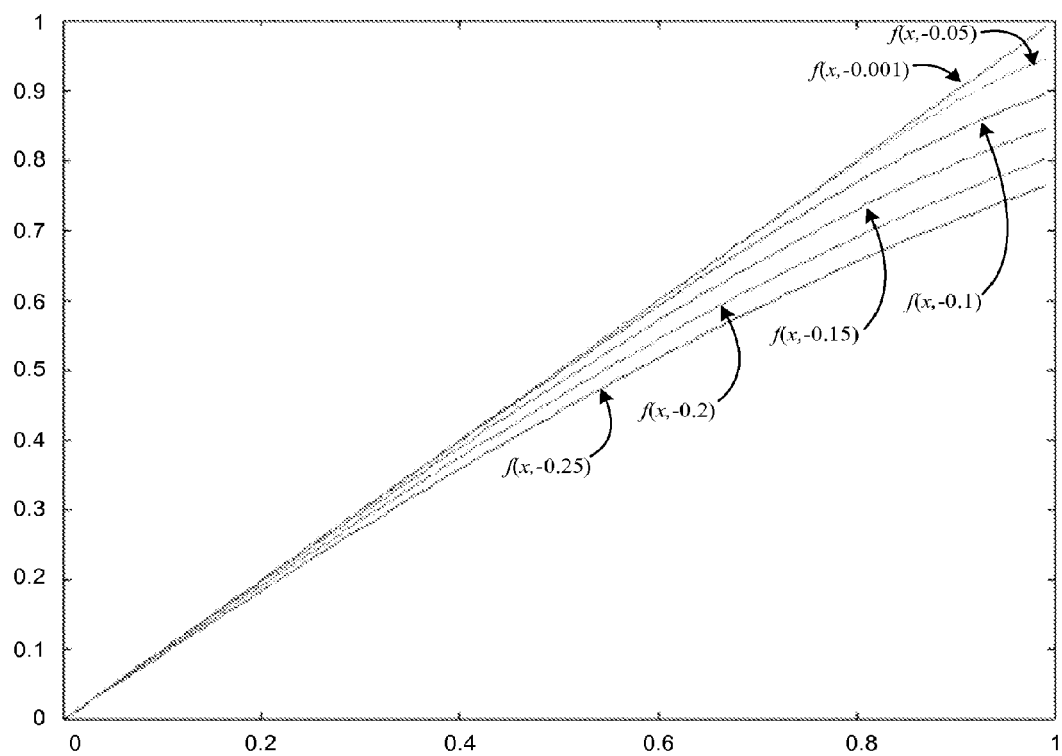
FIG. 2 is a graph showing several curves each corresponding to a different value for h in a remapping function used in some embodiments, shown on a 0-1 scale on both axes for illustrative purposes.

FIG. 2 is a graph showing several curves each corresponding to a different value for h in Equation (7), shown on a 0-1 scale on both axes for illustrative purposes. Note that, as h approaches 0, the curve approaches a straight line where 0 maps to 0, 0.5 maps to 0.5, and 1 maps to 1. As h increases in absolute magnitude, the curve drops significantly at the high range, is not affected much at all at the low range, and is moderately affected in the middle range. The drop at the high range graphically illustrates the space at the top of the dynamic range that the remapping function given in equation (8) leaves for the details.

Figure 3:
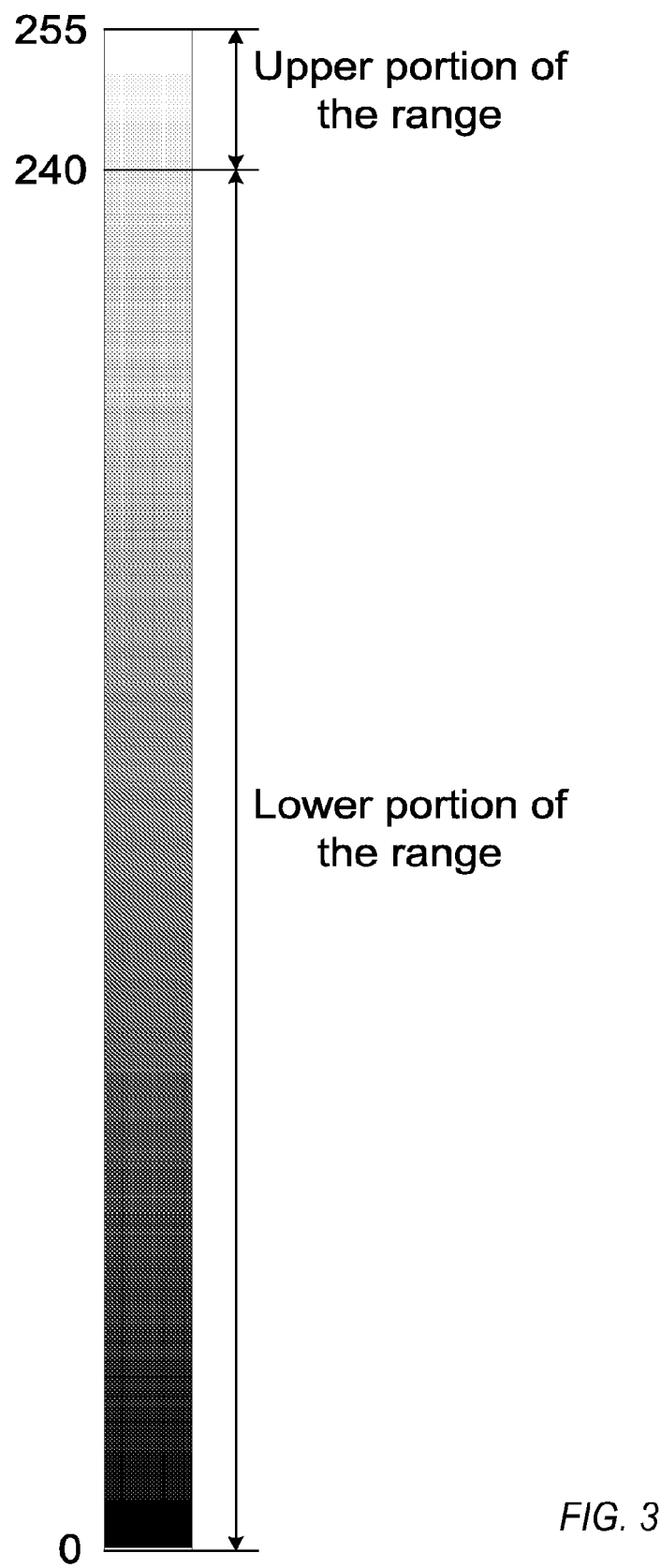
FIG. 3 graphically illustrates an example of a dynamic range divided into a lower portion and an upper portion according to some embodiments.

FIG. 3 graphically illustrates an example of a dynamic range divided into a lower portion and an upper portion according to some embodiments. In this example, a dynamic range of 0 . . . 255 is shown. The top of the lower portion of the range to which the base layer is compressed is 240. The upper portion of the range (241-255) is the space in the lower dynamic range for the uncompressed details from the HDR image.

To ensure that the image details in the highlight areas are not clipped, some embodiments may set h in equation (8) to a default value, which may for example be defined as follows:

$$h_{def} = -p_{97.5\%}(D) \tag{9}$$

Some embodiments may provide a user interface element that allows the user to adjust h in equation (8). In some embodiments, instead of controlling h directly, a user may control the percentile value shown in equation (9) via the user interface. That is, a value v, controlled via a user interface element such as a slider, may be used to set $h = -p_{v\%}(D)$. This allows for the highlight user interface element to depend on the actual setting of the bilateral filter and on the image being processed.

Other embodiments may use other techniques or formulas, or variations of those given above, to compress the highlights of the base layer so as to leave room at the top of the range for the luminance details. For example, in some embodiments, as an alternative to equations (7) and (8), the following may be used to remap pixels:

$$\Delta = B_{max} - B_{min}$$

$$\alpha = \frac{(x - B_{min})}{\Delta}$$

if($\alpha < t$)

$$B_h(x) = x$$

else $$\beta = \frac{(\alpha - t)}{1 - t}$$

$$B_h(x) = x + \left(1 - \cos\left(\beta * \frac{\pi}{2}\right)\right) * h$$

end if where h is a user-controlled parameter that controls the brightness of the highlight areas, and t is a threshold value. For example, t may be 0.75, but other values may be used. In some embodiments, t may be specified by the user.

Controlling Shadows

As indicated at 144 of FIG. 1B, a remapping function may be applied to control shadows of the base layer B 110. Some embodiments may use a similar approach as that described above for compressing highlights to control the darkness of shadows. In some embodiments, the remapping for shadow control may be based on the following function:

$$g(x, h) = \begin{cases} 2h & \text{if } x = 0 \\ x & \text{if } h = 0 \\ \dfrac{2x}{1 - \exp(-x/h)} & \text{if } h > 0 \\ 3x - \dfrac{x}{1 - \exp(x/h)} & \text{otherwise} \end{cases} \quad (10)$$

where x is the remapped value, while h controls how much the dark pixels are brightened. For example, h=0 leaves the shadows unchanged, while h=0.5 brightens the shadow by one log-luminance unit (the effect is twice the value of h). Some embodiments may use this function to remap the value $B_h$ for a pixel x as follows:

$$B_{hs}(x) = (g(B_h(x) - B_{min}, s) - g(\Delta B + h, s) + h - f(-\Delta B, h) \quad (11)$$

where s controls the darkness of the shadows. In some embodiments, s is set to 0 by default. Some embodiments may provide a user interface element that allows the user to adjust s in equation (11).

Other embodiments may use other techniques or formulas, or variations of those given above, to control the shadows. For example, in some embodiments, the following may be used to control shadows instead of equations (10) and (11):

$$\Delta = B_{max} - B_{min}$$
$$\alpha = \frac{(x - B_{min})}{\Delta}$$
if($\alpha > t$)
$$B_h(x) = x$$
else
$$\beta = \frac{(t - \alpha)}{t}$$
$$B_h(x) = x + \left(1 - \cos\left(\beta * \frac{\pi}{2}\right)\right) * h$$
end if where h is a user-controlled parameter that controls the brightness of the highlight areas, and t is a threshold value. For example, t may be 0.5, but other values may be used. In some embodiments, t may be specified by the user.

Controlling the Contrast

As indicated at 146 of FIG. 1B, a function may be applied to control the contrast of the base layer. In some embodiments, the contrast of the base layer may be controlled via a contrast parameter in the following function:

$$B_{hsc}(x) = B_{hs}(x) \frac{\ln(\text{contrast})}{\Delta B} \quad (12)$$

In some embodiments, the default value of the contrast parameter is 125. Some embodiments may provide a user interface element that allows the user to adjust the contrast parameter.

Other embodiments may use other techniques or formulas, or variations of those given above, to control the contrast.

Adjusting the Detail Layer

As indicated at 116 of FIG. 1A, the detail layer may be adjusted. In some embodiments, the amount of detail visible in the image may be controlled via a texture scaling factor:

$$D_t(x) = \text{texture} \times D(x) \quad (13)$$

In some embodiments, the texture scaling factor is set by default to 1.2. Some embodiments may provide a user interface element that allows the user to adjust the texture scaling factor.

Other embodiments may use other techniques or formulas, or variations of those given above, to adjust the detail layer.

Recomposing the Image

Combining Base and Detail Layers

As indicated at 118 of FIG. 1A, the compressed base layer and adjusted detail layer may be combined to generate $L_{out}$. In some embodiments, the output luminance layer $L_{out}$ may be obtained by adding the compressed base layer and adjusted detail layer and inverting the logarithm:

$$L_{out} = \exp(B_{hsc} + D_t) \quad (14)$$

As previously noted, the base layer compression technique used in embodiments leaves space at the high end of the dynamic range for the luminance details; $D_t$ goes into this space.

Other embodiments may use other techniques or formulas, or variations of those given above, to combine the compressed base layer and adjusted detail layer.

Adjusting the Exposure

As indicated at 122 of FIG. 1A, exposure may be adjusted for $L_{out}$ to generate $L_{exp}$ 124. In some embodiments, exposure adjustment may be performed via an exposure scaling factor. In some embodiments, the default value of the exposure scaling factor is 1:

$$L_{exp} = \text{exposure} \times L_{out} \quad (15)$$

Some embodiments may provide a user interface element for adjusting the exposure scaling factor. In some embodiments, an exposure adjustment user interface element, e.g. a slider, may be expressed in stops; that is, the user interface element value corresponds to $\log_2(\text{exposure})$.

Other embodiments may use other techniques or formulas, or variations of those given above, to adjust the exposure of $L_{out}$.

Putting Back the Color

As indicated at 126 of FIG. 1A, $L_{exp}$ 124 and color C 106 may be combined to generate the output image $I_{out}$ 130. In some embodiments, the values (e.g., RGB values) may be obtained by multiplying back the color ratios C to $L_{exp}$:

$$I_{out} = L_{exp} \times C \quad (16)$$

This produces the final image $I_{out}$. In some embodiments, the values (e.g., RGB values) are linear, i.e. are not gamma-corrected.

Other embodiments may use other techniques or formulas, or variations of those given above, to combine output luminance and color to generate a tone mapped output image.

Adjusting the Saturation

In some embodiments, color saturation may be adjusted using a saturation tool based on a YCC color space. YCC color space is also referred to as YCbCr color space, where Y is the luma component and Cb and Cr are the blue-difference and red-difference chroma components. Other embodiments may use other techniques to adjust the saturation.

Figure 4:
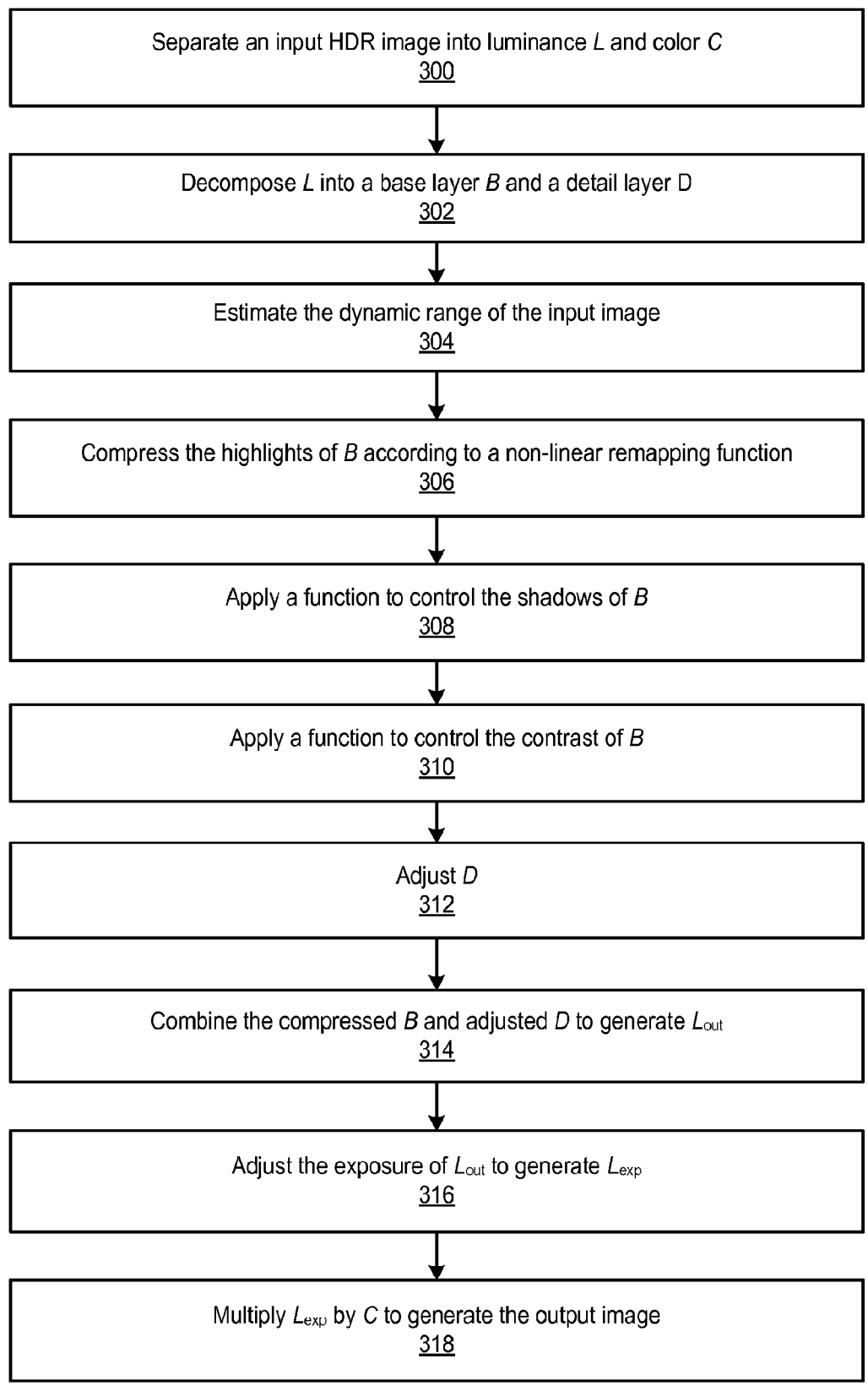
FIG. 4 is a flowchart illustrating a method for tone mapping High Dynamic Range (HDR) images according to some embodiments.

FIG. 4—Flowchart of a Method for Tone Mapping HDR Images

FIG. 4 is a flowchart illustrating a method for tone mapping High Dynamic Range (HDR) images according to some embodiments. The method shown in FIG. 4 may be used in conjunction with embodiments of the computer system shown in FIG. 7, among other devices. In various embodiments, some of the method elements shown may be performed concurrently, in a different order than shown, or may be omitted. Additional method elements may also be performed as desired. Any of the method elements described may be performed automatically (i.e., without user intervention). As shown, this method may operate as follows.

As indicated at 300, an input HDR image is separated into luminance L and color C. As indicated at 302, L is decomposed into a base layer B and a detail layer D.

Elements 304 through 310 correspond to compress base layer 112 of FIG. 1A and to FIG. 1B, which shows details of element 112. As indicated at 304 of FIG. 4, the dynamic range of the input image may be estimated. As indicated at 306, highlights of B may be compressed according to a non-linear remapping function that provides space at the top of the intensity scale where the details and variations may be displayed. As indicated at 308 a function to control shadows of B may be applied. As indicated at 310, a function to control contrast of B may be applied.

As indicated at 312, the details D may be adjusted; for example D may be amplified to more clearly reveal the image details.

As indicated at 314, the compressed base layer B and adjusted detail layer D may be combined to generate the output luminance, $L_{out}$. As indicated at 316, in some embodiments, the exposure of $L_{out}$ may be adjusted to generate $L_{exp}$. As indicated at 318, the color and luminance may be recombined to generate the output image. For example, $L_{exp}$ may be multiplied by C to generate the output image.

FIG. 5—Example User Interface

FIG. 5 shows an example user interface to a tone mapping module that implements a method for tone mapping HDR images as described in FIGS. 1A through 4. Some embodiments may provide a user interface that includes user interface elements via which a user may control one or more parameters of the tone mapping method. The user interface may provide one or more user interface elements to control one or more of the following parameters, and/or other parameters not listed here:

- Glow extent and Glow strength: These two parameters affect the bilateral filter and control the size and strength of the glows (a.k.a. halos) that may be visible around contrasted edges.
- Contrast: controls the dynamic range of the output, that is, the difference of the brightest and darkest points.
- Detail: controls the amplitude of the texture.
- Exposure: globally scales up or down the image intensities.
- Shadow: brightens or darkens the dark regions of the images.
- Highlight: brightens or darkens the bright regions of the images.
- Saturation: controls the saturation of the colors.

Some embodiments may also include a gamma control user interface element or elements and/or a vibrance control user interface element or elements as shown in FIG. 5. Some embodiments may also include one or more other user interface elements, such as a toning curve and histogram display as shown in FIG. 5, a menu whereby a user may select a set of previously specified default settings for the parameters (shown as "preset" in FIG. 5, where "custom" is currently selected), one or more standard dialog user interface elements such as the "OK" and "CANCEL" buttons shown in FIG. 5, and one or more checkboxes such as the "preview" checkbox shown in FIG. 5.

While FIG. 5 shows slider bars and/or text boxes that may be used to control and display the settings of various parameters, other types of user interface elements, such as dials, menus, and so on, may be used in various embodiments of the user interface.

In some embodiments, default values may be used for the various parameters that attempt to produce images that look as much as possible like normal photographs. However, via the user interface, users may modify one or more of the parameters, for example using the user interface elements shown in FIG. 5 such as slider bars, to obtain an "HDR look" (glowing edges, low contrast, and saturated colors) in images, for example by increasing the glow extent and glow strength, reducing the contrast, and increasing saturation and texture, or may modify one or more parameters to achieve various other desired visual effects.

Example Implementations

FIG. 6 illustrates a tone mapping module that may implement an embodiment of the method for tone mapping HDR images illustrated in FIGS. 1A through 4. FIG. 7 illustrates an example computer system on which embodiments of module 920 may be implemented. Module 920 receives as input an HDR image 910. Module 920 may receive user input 912 adjusting one or more of various parameters used in the tone mapping method as described herein. Module 920 performs the tone mapping method as described herein on the input HDR image 910, according to user input 912 received via user interface 922, if any, or according to default values if user input 912 does not specify other values. Module 920 generates as output an image 930 that has a more limited dynamic range than the input HDR image, and that may approximate the appearance of an HDR image. Image 930 may be formatted according to an image format via which the image 930 may be displayed on a display device and/or printed to a printer. Output image 930 may, for example, be stored to a storage medium 940, such as system memory, a disk drive, DVD, CD, etc., displayed on a display device, printed via a printer, etc. Note that input HDR image 910 may also be stored to a storage medium 940, but typically cannot be directly displayed to a display device or printed to a printer.

In some embodiments, module 920 may provide a user interface 922 via which a user may interact with the module 920, for example to adjust one or more of various parameters used in the tone mapping method as described herein. In some embodiments, the user interface may provide user interface elements whereby the user may adjust parameters including, but not limited to, glow extent, glow strength, contrast, gamma, detail (texture), exposure, shadow, highlight, vibrance, and saturation. FIG. 5 shows an example user interface that may be used in some embodiments.

Example System

Embodiments of a tone mapping module as described herein may be executed on one or more computer systems, which may interact with various other devices. One such computer system is illustrated by FIG. 7. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modem GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a tone mapping module are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include computer-readable storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 7, memory 1020 may include program instructions 1025, configured to implement embodiments of a tone mapping module as described herein, and data storage 1035, comprising various data accessible by program instructions 1025. In one embodiment, program instructions 1025 may include software elements of embodiments of a tone mapping module as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of a tone mapping module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a standalone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include computer-readable storage media or memory media such as magnetic or optical media, e.g., disk or DVD/CD-ROM, volatile or non-volatile media such as RAM (e.g. SDRAM, DDR, RDRAM, SRAM, etc.), ROM, etc. Program instructions and data stored via a computer-accessible medium may be transmitted by transmission media or signals such as electrical, electromagnetic, or digital signals, which may be conveyed via a communication medium such as a network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method, comprising:
 decomposing a luminance component of a high dynamic range (HDR) image into a base layer including larger-scale variations in contrast and a details layer including smaller-scale variations in contrast;
 generating an estimate of how much of a lower dynamic range is to be used for luminance values in the details layer;
 setting a maximum of a lower portion of the lower dynamic range according to the estimate;
 subsequent to generating the estimate, remapping luminance values of the base layer to the lower portion of the lower dynamic range to generate a compressed base layer, said remapping leaving an upper portion of the lower dynamic range for the details layer of the luminance component; and
 combining the compressed base layer and the details layer to generate output luminance scaled according to the lower dynamic range, the luminance values of the compressed base layer being in the lower portion of the lower dynamic range and luminance values of the details layer being in the upper portion of the lower dynamic range.

2. The computer-implemented method as recited in claim 1, wherein said remapping luminance values of the base layer to a lower portion of a lower dynamic range is performed according to a nonlinear remapping function that compresses luminance values of higher intensity more than luminance values of lower intensity.

3. The computer-implemented method as recited in claim 1, further comprising applying a remapping function to control one or more shadows in the compressed base layer, wherein the applying the remapping function to control the one or more shadows in the compressed base includes applying the remapping function to control darkness of the one or more shadows in the compressed base layer.

4. The computer-implemented method as recited in claim 1, further comprising adjusting the luminance values in the details layer prior to said combining the compressed base layer and the details layer.

5. The computer-implemented method as recited in claim 1, further comprising:
 separating the HDR image into the luminance component and a color component prior to said decomposing the luminance component; and
 combining the color component and the output luminance to generate an output image of the lower dynamic range.

6. The computer-implemented method as recited in claim 5, further comprising adjusting exposure in the output luminance prior to said combining the color component and the output luminance.

7. A system, comprising:
 at least one processor; and
 a memory comprising program instructions, the program instructions being executable by the at least one processor to:
 output a user interface to a display of a display device, the user interface enabling tone mapping of a high dynamic range (HDR) image;
 provide, via the user interface, one or more user interface elements to control one or more parameters of the HDR image; and
 responsive to receiving an input that adjusts the one or more parameters, generate an output image having a more limited dynamic range than the HDR image, to generate the output image including performing the following in accordance with the adjusted one or more parameters:
 decompose a luminance component of the HDR image into a base layer including larger-scale variations in contrast and a details layer including smaller-scale variations in contrast;

generate an estimate of how much of a lower dynamic range is to be used for luminance values in the details layer;

set a maximum of a lower portion of the lower dynamic range according to the estimate;

subsequent to generating the estimate, remap luminance values of the base layer to the lower portion of the lower dynamic range to generate a compressed base layer, said remapping leaving an upper portion of the lower dynamic range for the details layer of the luminance component; and combine the compressed base layer and the details layer to generate output luminance scaled according to the lower dynamic range, the luminance values of the compressed base layer being in the lower portion of the lower dynamic range and luminance values of the details layer being in the upper portion of the lower dynamic range.

8. The system as recited in claim 7, wherein to generate the output image further includes performing one or more of the following in accordance with the adjusted one or more parameters:

apply a nonlinear remapping function that compresses luminance values of higher intensity more than luminance values of lower intensity;

apply a remapping function to control the darkness of shadows in the compressed base layer prior to said combining the compressed base layer and the details layer; and adjust the luminance values in the details layer prior to said combining the compressed base layer and the details layer.

9. The system as recited in claim 7, wherein to control one or more parameters of the HDR image includes to control one or more of glow extent, glow strength, contrast, gamma, detail, exposure, shadow, highlight, vibrance, and saturation.

10. The system as recited in claim 7, wherein the user interface further includes a toning curve and histogram display.

11. A non-transitory computer-readable storage medium storing program instructions, the program instructions are computer-executable to implement:

decomposing a luminance component of a high dynamic range (HDR) image into a base layer including larger-scale variations in contrast and a details layer including smaller-scale variations in contrast;

generating an estimate of how much of a lower dynamic range is to be used for luminance values in the details layer;

setting a maximum of a lower portion of the lower dynamic range according to the estimate;

subsequent to generating the estimate, remapping luminance values of the base layer to the lower portion of the lower dynamic range to generate a compressed base layer, said remapping leaving an upper portion of the lower dynamic range for the details layer of the luminance component; and combining the compressed base layer and the adjusted details layer to generate output luminance scaled according to the lower dynamic range, the luminance values of the compressed base layer being in the lower portion of the lower dynamic range and luminance values of the adjusted details layer are in the upper portion of the lower dynamic range.

12. The non-transitory computer-readable storage medium as recited in claim 11, wherein said remapping luminance values of the base layer to a lower portion of a lower dynamic range is performed according to a nonlinear remapping function that compresses luminance values of higher intensity more than luminance values of lower intensity.

13. The non-transitory computer-readable storage medium as recited in claim 11, wherein the program instructions are computer-executable to implement applying a remapping function to control the darkness of shadows in the compressed base layer prior to said combining the compressed base layer and the adjusted details layer.

14. The non-transitory computer-readable storage medium as recited in claim 11, wherein the program instructions are computer-executable to implement adjusting exposure of the output luminance.

15. The non-transitory computer-readable storage medium as recited in claim 11, wherein the program instructions are computer-executable to implement:

separating the HDR image into the luminance component and a color component prior to said decomposing the luminance component; and combining the color component and the output luminance to generate an output image of the lower dynamic range.

16. The computer-implemented method as recited in claim 1, further comprising applying a remapping function to control one or more shadows in the compressed base layer.

17. The computer-implemented method as recited in claim 1, further comprising adjusting exposure of the output luminance.

18. The system as recited in claim 7, wherein to generate the output image further includes applying a remapping function to control one or more shadows in the compressed base layer.

19. The system as recited in claim 7, the program instructions being further executable by the at least one processor to display the generated output image via the user interface.

20. The non-transitory computer-readable storage medium as recited in claim 11, wherein the program instructions are computer-executable to implement adjusting the luminance values in the details layer prior to said combining the compressed base layer and the details layer.

* * * * *